United States Patent [19]

Waechter et al.

[11] Patent Number: 4,536,841
[45] Date of Patent: Aug. 20, 1985

[54] PORTABLE NEUTRON SPECTROMETER AND DOSIMETER

[75] Inventors: David A. Waechter; Bruce H. Erkkila; Dennis G. Vasilik, all of Los Alamos, N. Mex.

[73] Assignee: The United States of America as represented by the United States Department of Energy, Washington, D.C.

[21] Appl. No.: 464,841

[22] Filed: Feb. 8, 1983

[51] Int. Cl.³ .............................................. G06F 15/42
[52] U.S. Cl. .............................. 364/414; 250/370 C; 250/388; 250/392
[58] Field of Search .................... 364/414; 250/370 B, 250/370 C, 370 E, 370 F, 370 K, 374, 390, 392, 388

[56] References Cited

U.S. PATENT DOCUMENTS

| 3,896,309 | 7/1975 | Halsor et al. | 250/370 X |
| 4,217,497 | 8/1980 | Daniels et al. | 250/369 |
| 4,445,036 | 4/1984 | Selph | 250/370 C X |

OTHER PUBLICATIONS

*Hand-Held Gamma Ray Spectrometer Gun*, Waechter et al, IEEE Trans. Nc-Sc 28, #1, p. 301, (1981).
*"Rascal"*, Portable Neutron Rem Meter, Eberline, PRS-2P, Oct. 1978.
*Pocket Neutron Rem Meter*, Quam et al, IEEE Trans-Nuc. Sci-29, #1, p. 637, (1982).

Primary Examiner—Jerry Smith
Assistant Examiner—Louis Woo
Attorney, Agent, or Firm—Leonard C. Brenner; Paul D. Gaetjens; Judson R. Hightower

[57] ABSTRACT

The disclosure relates to a battery operated neutron spectrometer/dosimeter utilizing a microprocessor, a built-in tissue equivalent LET neutron detector, and a 128-channel pulse height analyzer with integral liquid crystal display. The apparatus calculates doses and dose rates from neutrons incident on the detector and displays a spectrum of rad or rem as a function of keV per micron of equivalent tissue and also calculates and displays accumulated dose in millirads and millirem as well as neutron dose rates in millirads per hour and millirem per hour.

3 Claims, 18 Drawing Figures

PORTABLE NEUTRON SPECTROMETER AND DOSIMETER

BACKGROUND OF THE INVENTION

The field of the invention relates to neutron spectrometry and dosimetry and particularly to neutron spectrometry and dosimetry using a portable battery operated apparatus. This invention is the result of a contract with the Department of Energy (Contract No. W-7405-ENG-36).

There is an existing need for a portable device capable of being easily carried into the field to remote locations to do diagnostic tests on neutron fields. Such a device should be capable of determining at a glance neutron dose rate in a selected location. It is also desirable that such a device be capable of analyzing the energies of neutrons within fields utilizing spectroscopy.

One object of the present invention is to obtain energy spectra of neutron radiation fields.

Another object of the invention is to calculate and display absorbed neutron dose in millirads and millirems and dose rate in millirads per hour and millirems per hour.

One advantage of the instant invention is that a preferred embodiment thereof weighs only about $8\frac{1}{2}$ pounds complete with an internal rechargeable battery pack.

Another advantage of the instant invention is that an embodiment thereof requires little maintenance of field support, it having few mechanical parts and being comprised largely of microprocessors and integrated circuits.

Still another advantage of the instant invention is that it can be utilized by a relatively unskilled technician because of its simple keyboard and easily read display.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a portable neutron spectrometer and dosimeter which comprises a detector for detecting neutrons within a preselected energy range. Circuitry is provided for receiving neutron signals generated from interactions with the detector and for generating a signal in accordance therewith. A microprocessor receives the generated signal and computes accumulated dose and dose rate for neutrons of various energy levels within the preselected energy range. A display operably connected to the microprocessor displays total dose and dose rate for the detected neutrons. Structure, in the preferred embodiment comprising a keyboard, is provided for controlling the apparatus. The detecting and signal generating circuitry may comprise a linear energy transfer proportional counter. circuitry for calibration comprises an internal Cm244 alpha source behind a shutter which is openable and closeable to produce an alpha peak in a predetermined channel of a pulse height analyzer incorporated within the device to calibrate the apparatus. In the preferred embodiment the display is a liquid crystal display, preferably a dot matrix display. The apparatus of the preferred embodiment is also fully powerable up to about five hours by six AA NiCd batteries.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF A PREFERRED EMBODIMENT OF THE INVENTION

Figure 1:
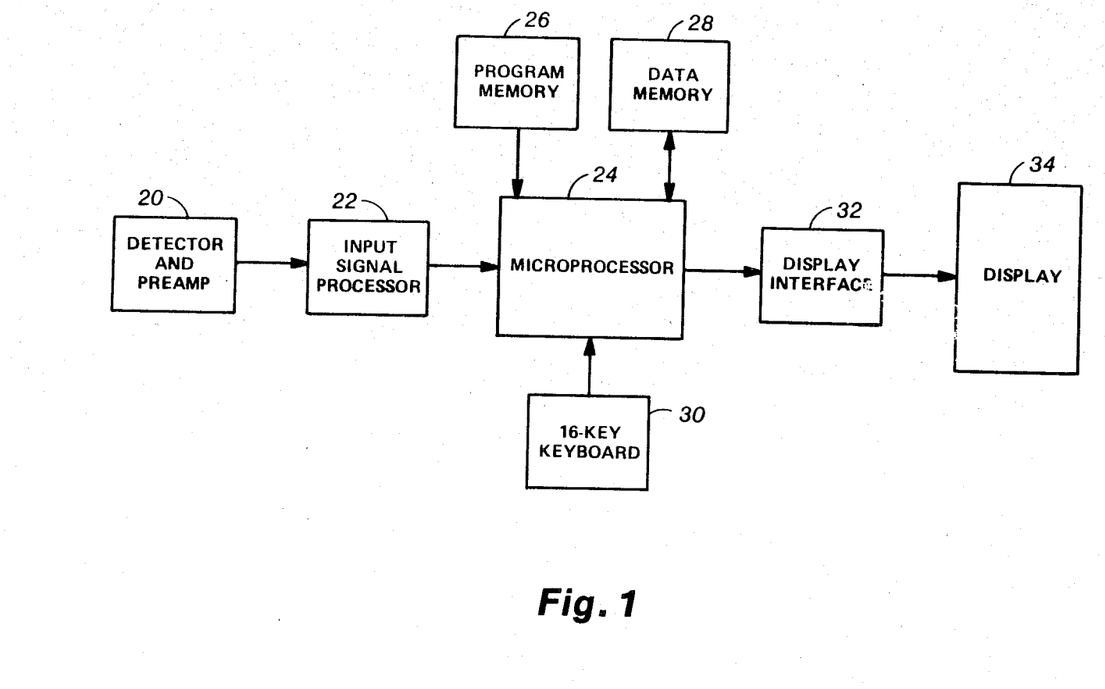
FIG. 1 is a block diagram of a preferred embodiment of the invention.
Figure 2:
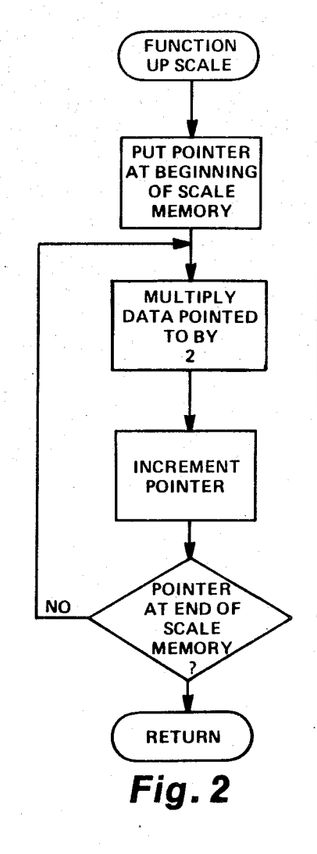
FIGS. 2 through 18 are flow charts illustrating the operation of the preferred embodiment of the invention.
Figure 3:
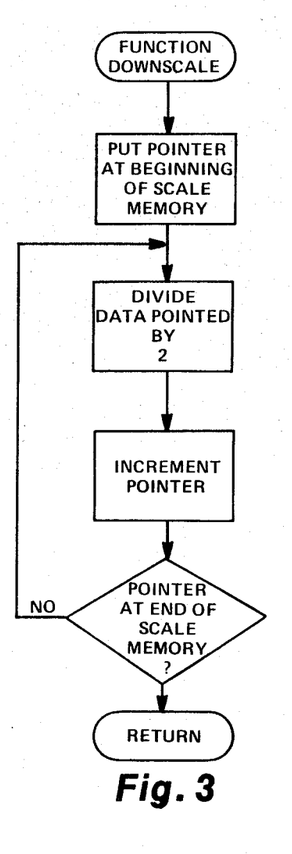
Figure 4:
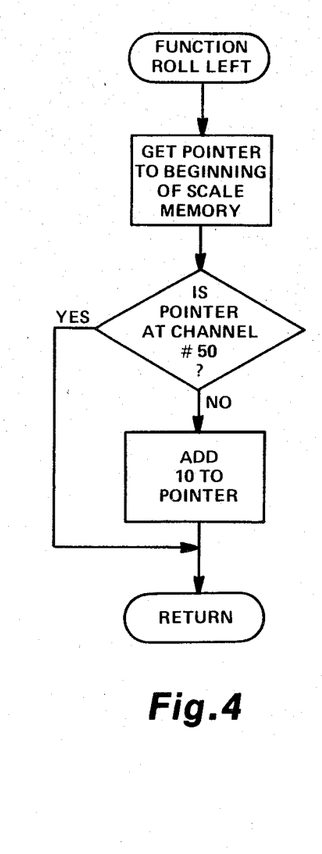
Figure 5:
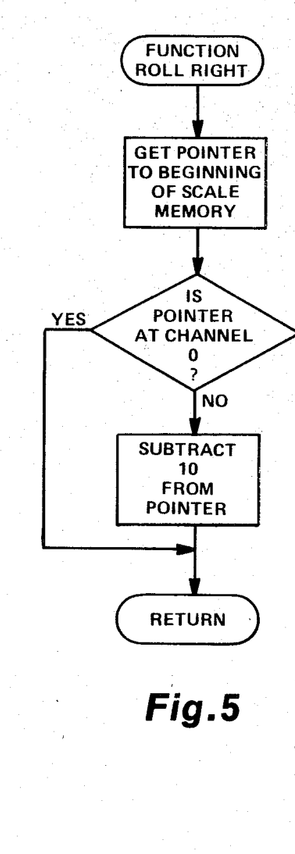
Figure 6:
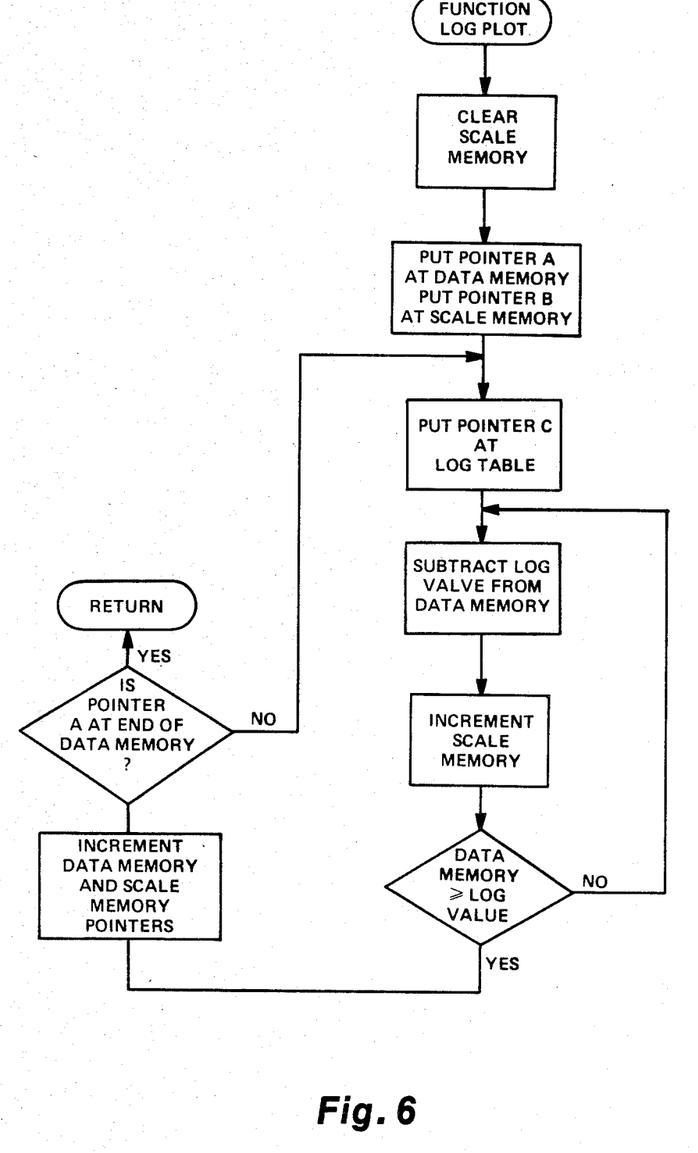
Figure 7:
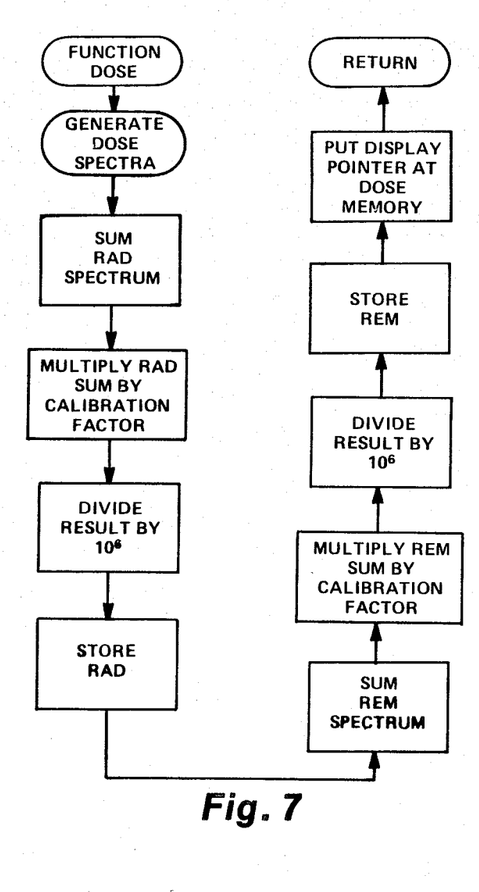
Figure 8:
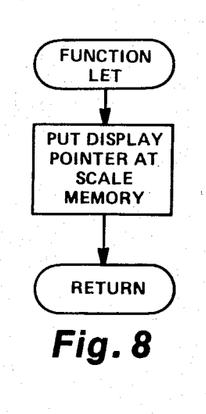
Figure 9:
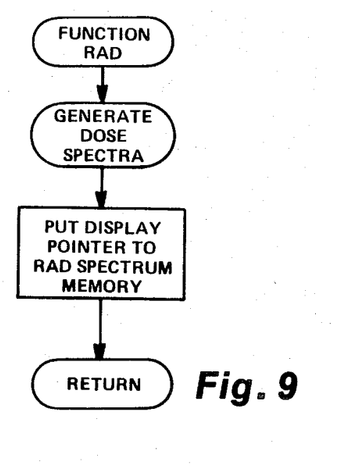
Figure 10:
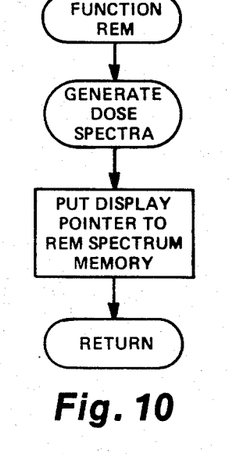
Figure 11:
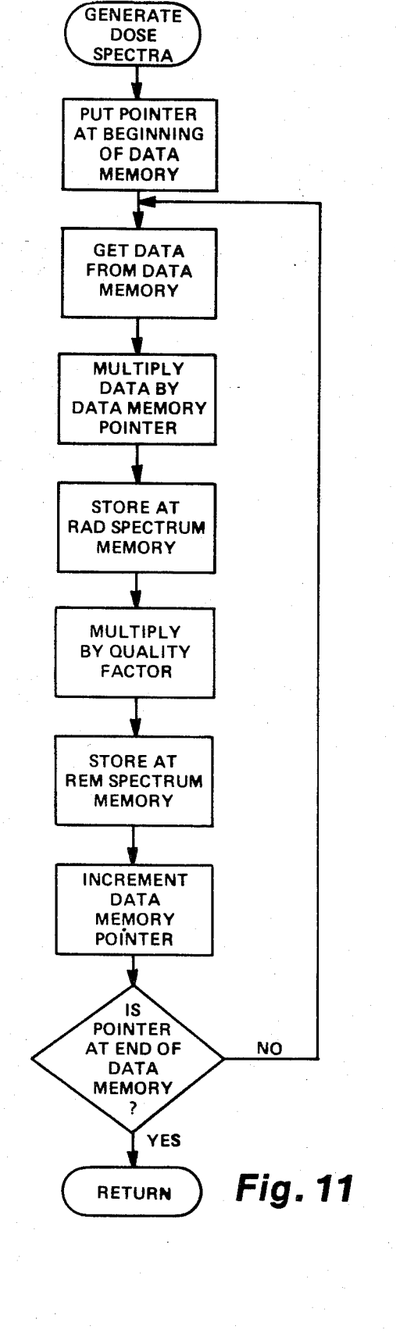
Figure 12:
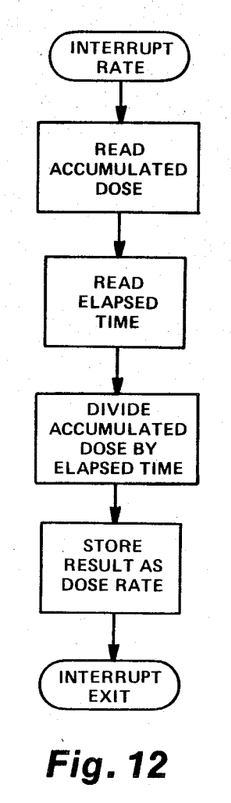
Figure 13:
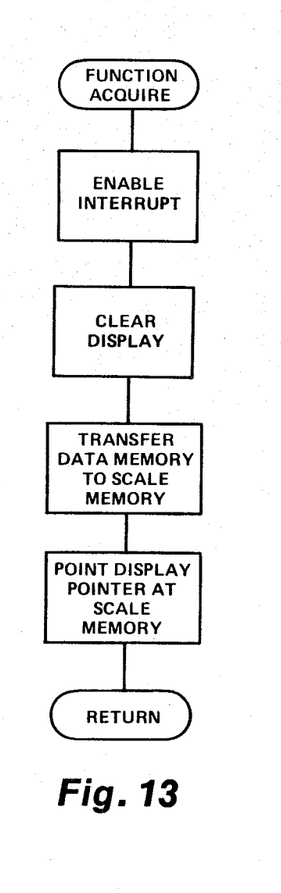
Figure 14:
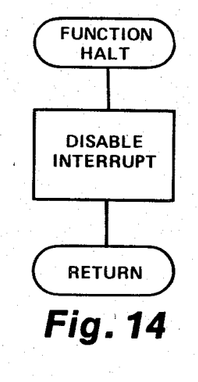
Figure 15:
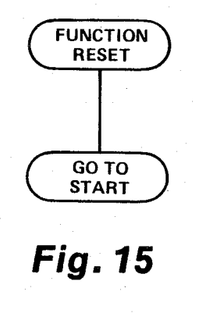
Figure 16:
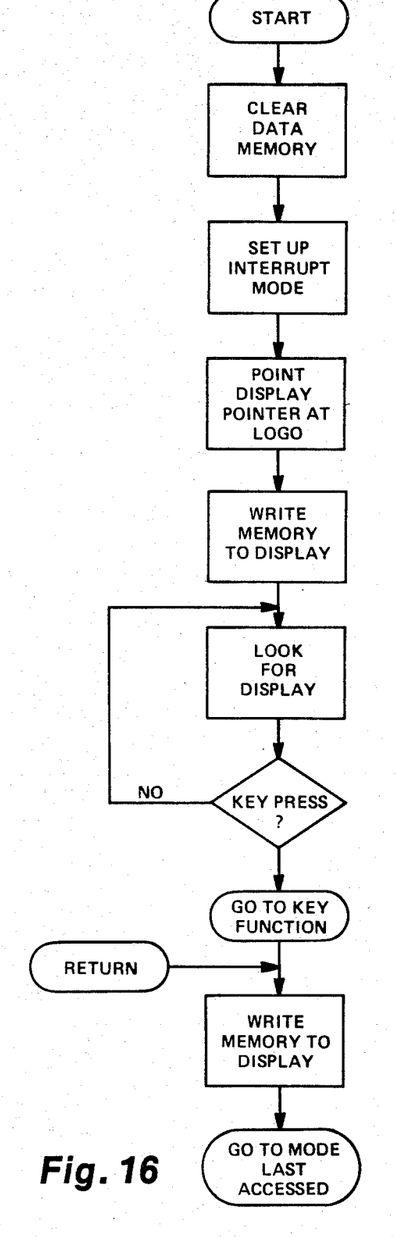
Figure 17:
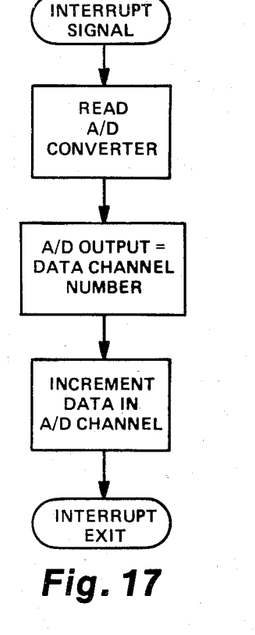
Figure 18:
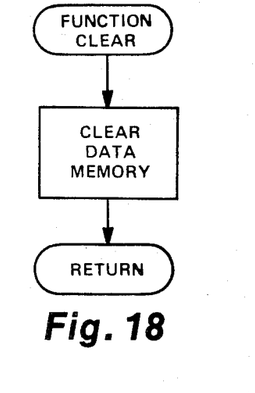

Reference is now made to FIG. 1 which illustrates in block form the various components of a preferred embodiment of the invention. The detector used may comprise, for example, a built-in tissue equivalent LET neutron detector. Such built-in detectors are known to those skilled in the art and may comprise, for example, LET counters. Such detectors are capable of generating spectra of recoil protons and reaction products caused by neutron interactions to enable indirect analyses of neutron radiation fields. FIG. 1 shows a preferred embodiment of the invention comprising such a detector and preamp 20 outputting through an input signal processor 22 which converts the detector's output signals into digital signals. Processor 22 outputs the digital signals to counter circuits in a microprocessor 24 controlled by a program memory 26. Microprocessor 24 stores the signals from signal processor 22 in a data memory 28. In the preferred embodiment a 16-key keyboard 30 controls the microprocessor which outputs through a display interface 32 to a display 34, in the preferred embodiment a liquid crystal display and in particular a dot matrix liquid crystal display. In the preferred embodiment display interface 22 and display 34 comprise a 128-channel pulse height analyzer using an integral liquid crystal display.

Microprocessor 24 calculates dose and dose rate from neutrons incident on the detector. At a user's option, as controlled through the keyboard 30, a raw data spectrum or a spectrum of rad or rem as a function of KeV per micron of equivalent tissue may be displayed on the display. Integrated doses and dose rates may also be displayed. Microprocessor 24 calculates and displays accumulated dose in millirads and millirem as well as displays dose rates in millirads per hour and millirems per hour. The high voltage power supply 14 of the preferred embodiment comprises a set of six AA rechargeable NiCd batteries having an average lifetime between charges of four to five hours. The apparatus may also be powered indefinitely through a voltage converter and conventional wall plug.

In the preferred embodiment a linear energy transfer (LET) proportional counter is preferably utilized. Such a counter comprises a hollow tissue equivalent plastic sphere filled with a tissue equivalent gas which reacts to recoil protons generated in the plastic wall of the device in much the same way as a 2-micron sphere of human tissue would react to such neutrons. Incoming neutrons generate recoil protons in the tissue equivalent wall.

The charge deposited by the protons is directly proportional to their LET. The detector pulses hence represent the spectrum of absorbed dose as a function of LET in the small tissue volume. An analog-to-digital converter digitizes the pulse output from the counter in the input signal processor and converts it to spectral information. From the resulting pulse height spectrum accumulated dose is calculated and displayed, dose rate being determined by dividing accumulated dose by the time elapsed, up to 20 hours. Resulting dose rates are displayed directly below the figures for accumulated dose in the preferred embodiment.

A calibration system is built into the preferred embodiment and comprises an internal Cm244 alpha source which can be exposed to the detector by activating a built-in magnetic shutter. A spectrum of the alpha source is accumulated and the gain of the input amplifiers adjusted to place the alpha peak in a predetermined channel number in a 128-channel analyzer. When the alpha peak is in the right position, all the constants used to calculate dose from the pulse height spectrum will be valid.

The input section of the device, comprising the detector and preamp and the input signal processor, is essentially a standard pulse height analyzer front end. Pulses from the detector are shaped and amplified by a preamp and then are fed with the proper timing to an 8-bit analog-to-digital converter. The converter outputs a digital word whose magnitude is proportional to the height of the input pulse. The microprocessor is desinged about an NSC800 low power CMOS microprocessor manufactured by National Semiconductor. The microprocessor is supported by 8K bytes of program memory 26 and 8K bytes of data memory 28 all of which are low power CMOS in order to minimize battery drain. The memory is sufficiently large to provide for future expansion of functions. The user communicates with the microprocessor through the 16-key keyboard 30 located on the front panel of the instrument. All of the functions and display modes can be readily accessed using the keyboard.

The display in the preferred embodiment is a dot matrix LCD array 80 dots wide and 28 dots high. The microprocessor communicates through two logic cards, one of which is provided by the manufacturer as part of the display. The display logic contains all the circuits necessary to convert the data from the microprocessor to readable spectral or dose information. In the preferred embodiment the display is manufactured by the Epson company and is designated by manufacturers part no. MA-B8906A. Also, part of the display logic is an on-board memory array which stores current display information. This array, with its associated logic, refreshes the display periodically so that the control processor does not have to be tied up for long periods, rewriting the same data to the display.

In the preferred embodiment signal acquisition is controlled by two keys on the keyboard, ACQ (acquire) and HLT (halt). The acquire key ACQ causes the input circuits to be enabled and initiates input signal processing by the microprocessor. Signal processing continues until the halt key HLT is pressed, the HLT key inhibiting the passage of further input pulses through the system. Four keys allow the operator to generate various types of displays. These are the DOSE, DATA, RAD, and REM keys. When pressed the DOSE key causes the microprocessor to calculate from the raw data integrated dose and dose rate. This information is presented on the display in units of millirads, millirem, millirads per hour and millirems per hour. A pulse height spectrum of incoming data will be generated on the display when the DATA key is pressed. Pressing the LOG key provides a spectrum of the same data displayed in semilog format. Pressing the RAD key causes the instrument to present a plot of the absorbed dose in millirads as a function of keV per micron of tissue. The REM key performs a similar function but displays integrated dose in millirem as a function of keV per micron of tissue.

Four keys provided on the instrument modify displayed spectra aiding in the analysis of spectral information. Up and down arrow keys provide vertical scale control. When pressed, they scale the spectrum up or down. A left arrow key allows the user to roll the display horizontally left ten channels at a time so that all 128 channels of any spectrum may be viewed. Similarly, a right arrow key rolls the display right 10 channels at a time. Finally, two control keys on the keyboard, a clear key CLR and a reset key RST, clear whatever is displayed be it dose or spectral information and reinitialize the instrument. The CLR key serves as an aid in calibrating the gain of input circuits and finds use whenever the operator needs to clear the data memories. The RST key has the same effect as turning the power off and back on and is used to start the dosimeter while keeping all the internal power supplies stable.

The preferred embodiment is directed to characterizing high energy neutron fields. Those skilled in the art will appreciate that the instrument of the preferred embodiment is not designed for neutrons with energies below about 100 keV. The small size of the dosimeter and its simplicity of operation ensure that it should find wide use in any area where workers might be exposed to fields of high energy neutrons.

The flow charts of FIGS. 3 through 18 illustrate the operation of the instrument of the preferred embodiment and are self-explanatory.

A listing of the program utilized in the preferred embodiment is included herewith.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A portable neutron spectrometer and dosimeter apparatus comprising:
   detector means including a Linear Energy Transfer proportional counter for detecting neutrons within a preselected energy range, said detector means further including means for generating pulses in accordance with energy levels of received neutrons and pulse height analyzer means for counting said generated pulses and for producing a spectral representation as an output thereof;
   microprocessor means for receiving the output of said detector means and for computing accumulated dose and dose rate for detected neutrons of various energy levels within the preselected energy range, said microprocessor means including a low power CMOS microprocessor, an 8k byte CMOS program memory and an 8k byte CMOS data memory;

display means including an approximately 80 by 28 dot matrix liquid crystal display operably connected to said microprocessor means for displaying said accumulated dose and dose rate for said detected neutrons; and internal calibration means for calibrating said apparatus, said calibration means including a Cm244 alpha source behind a shutter and means for opening and closing said shutter.

2. The apparatus according to claim 1 wherein said microprocessor means computes and said display means displays said accumulated dose in millirads and millirems and said dose rate in millirads/hr and millirems/hr.

3. The apparatus according the claim 2 further including: keyboard means for communicating with said microprocessor means, said keyboard means having:

an ACQ key to initiate processing by said microprocessor means;

an HLT key to inhibit further processing by said microprocessor means;

a DOSE key to enable said microprocessor to compute said accumulated dose; and a RATE key to enable said microprocessor to compute said dose rate.

* * * * *